Figure 7:
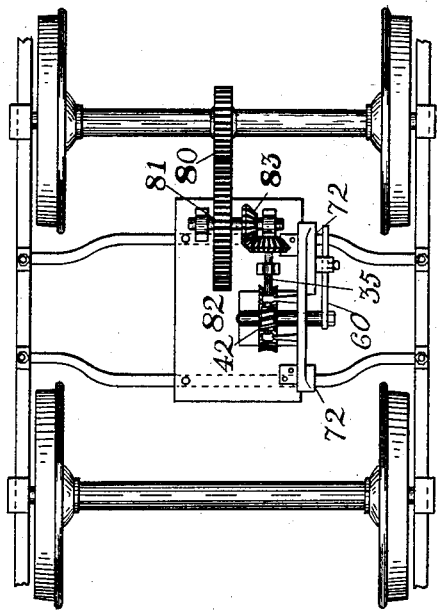

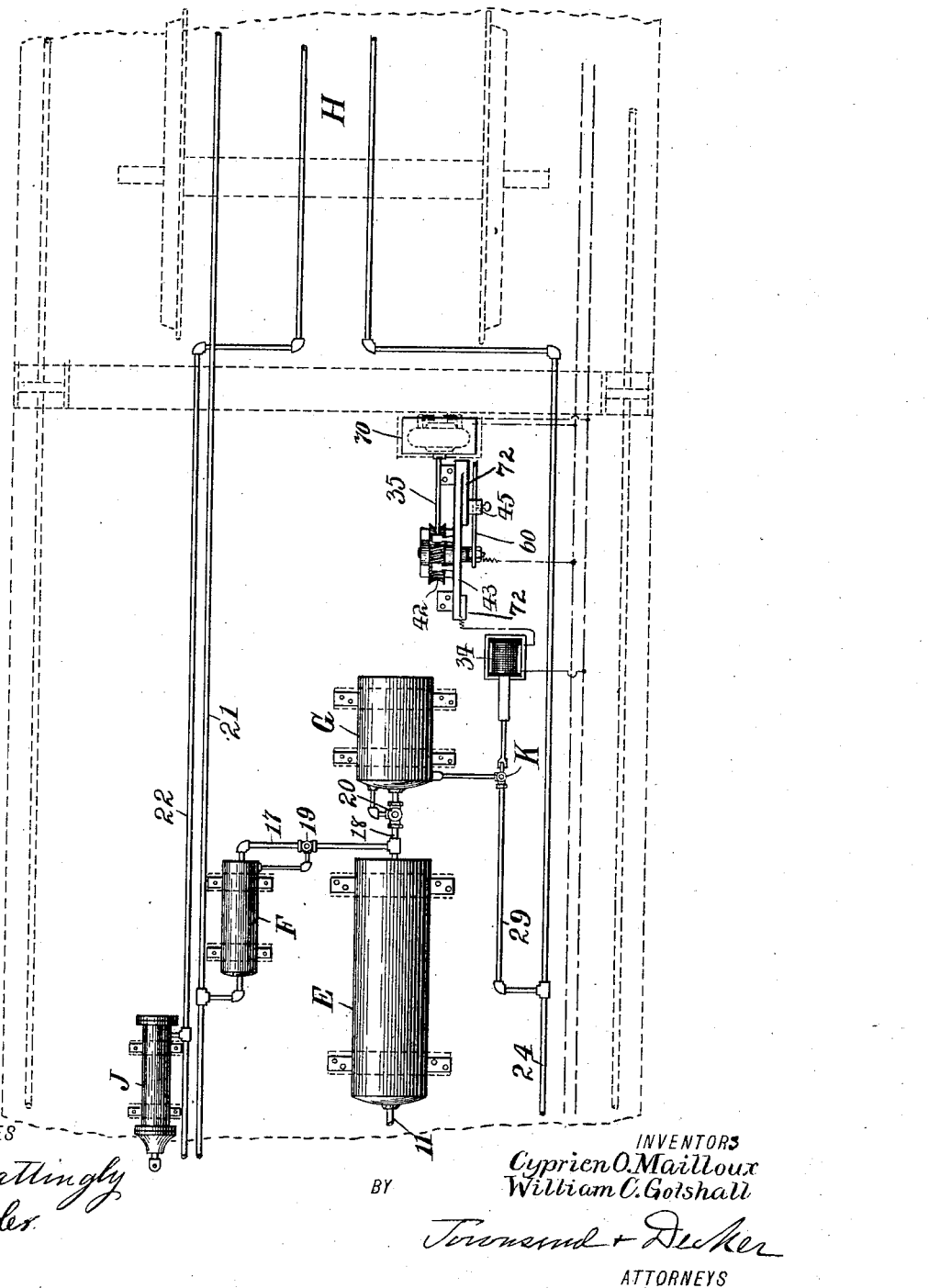

No. 719,020. PATENTED JAN. 27, 1903.
C. O. MAILLOUX & W. C. GOTSHALL.
RAILWAY ELECTRIC MOTOR COOLING SYSTEM.
APPLICATION FILED OCT. 6, 1902.
NO MODEL. 6 SHEETS—SHEET 2.
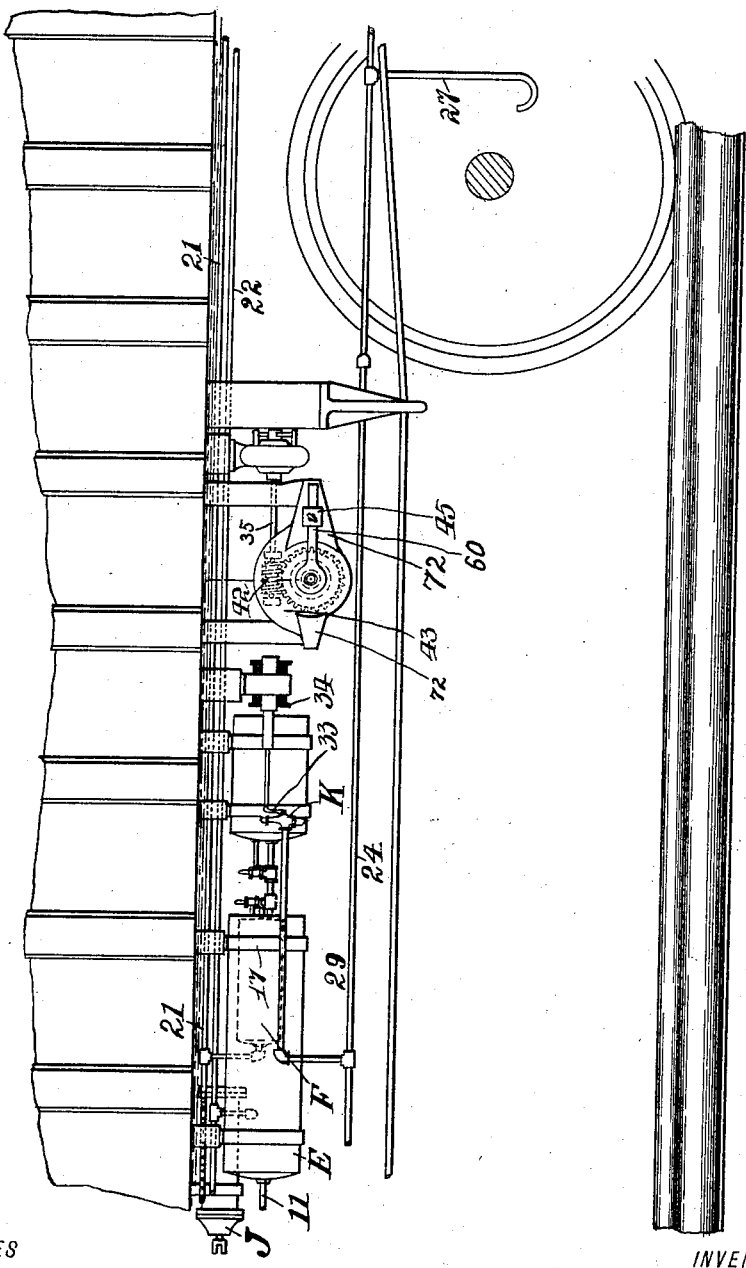

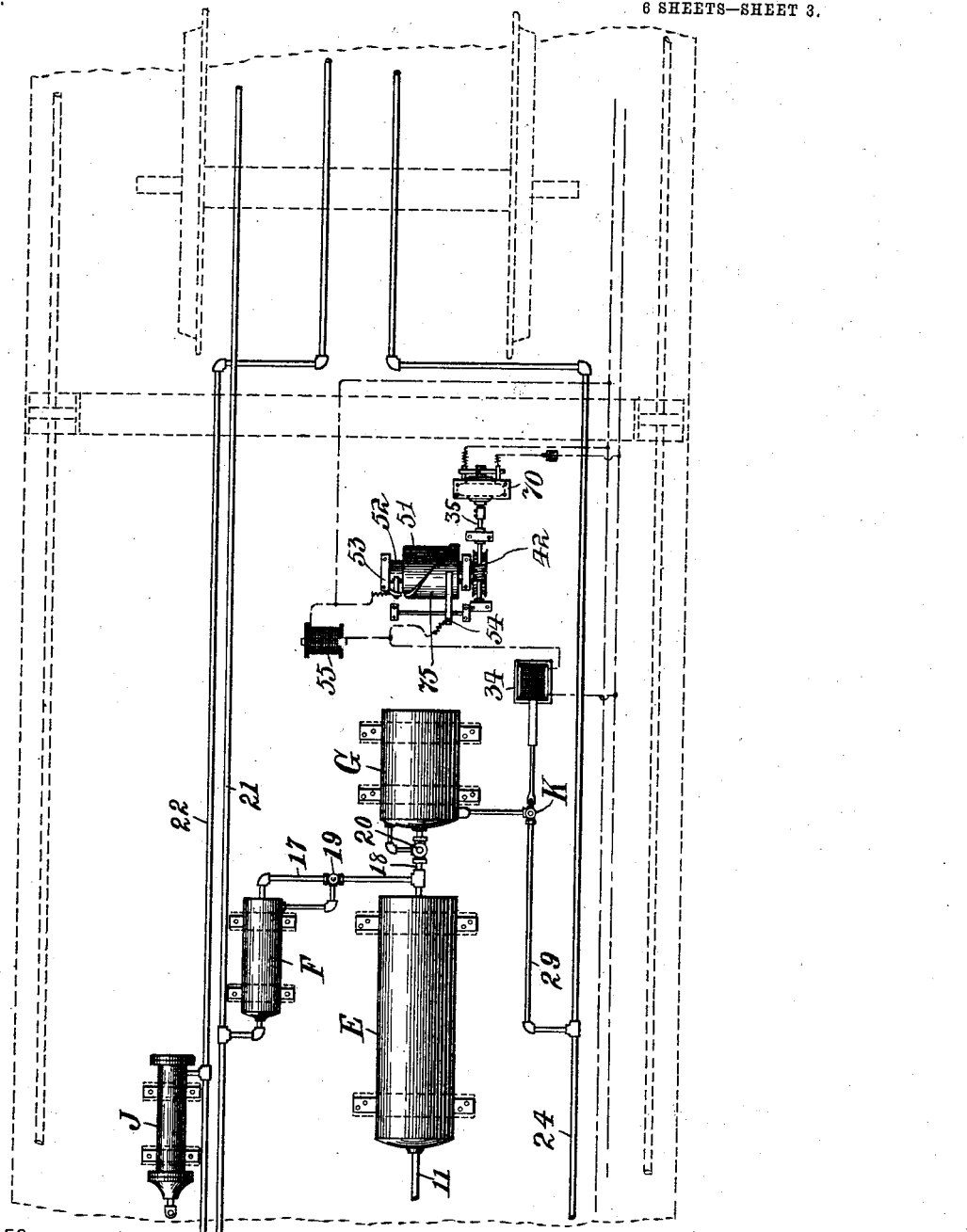

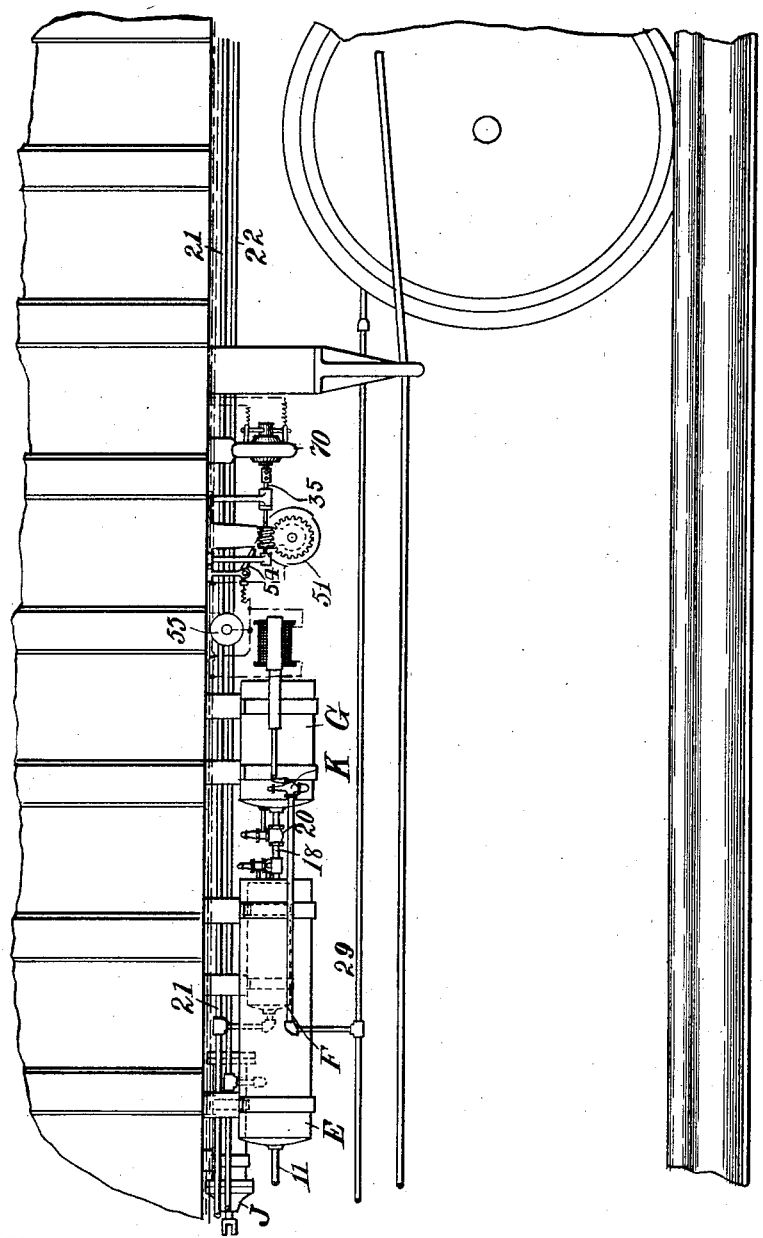

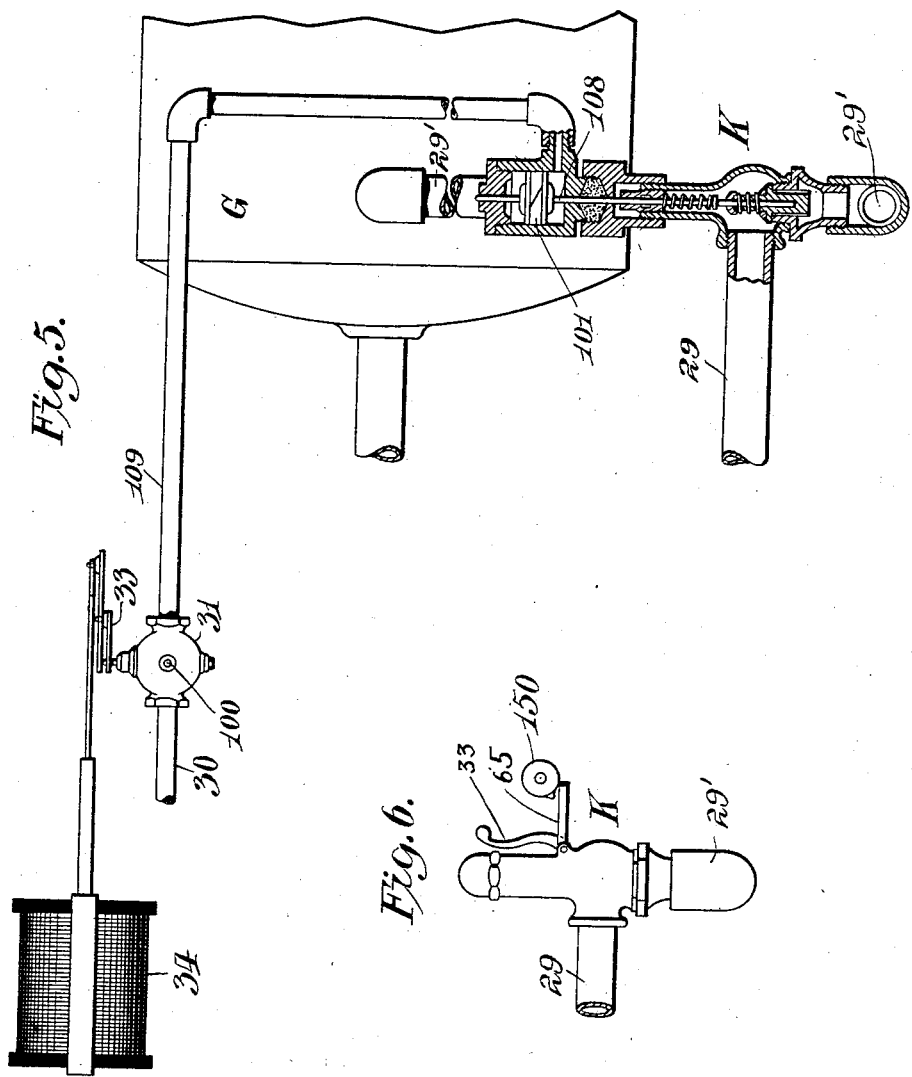

No. 719,020. PATENTED JAN. 27, 1903.
C. O. MAILLOUX & W. C. GOTSHALL.
RAILWAY ELECTRIC MOTOR COOLING SYSTEM.
APPLICATION FILED OCT. 6, 1902.
NO MODEL. 6 SHEETS—SHEET 6.

WITNESSES
A. F. Fischer
E. L. Lawler

INVENTORS
Cyprien O. Mailloux
William C. Gotshall

By
Townsend & Decker
ATTORNEYS

UNITED STATES PATENT OFFICE.

CYPRIEN O. MAILLOUX AND WILLIAM C. GOTSHALL, OF NEW YORK, N. Y.

RAILWAY-ELECTRIC-MOTOR-COOLING SYSTEM.

SPECIFICATION forming part of Letters Patent No. 719,020, dated January 27, 1903.

Application filed October 6, 1902. Serial No. 126,129. (No model.)

*To all whom it may concern:*

Be it known that we, CYPRIEN O. MAILLOUX and WILLIAM C. GOTSHALL, citizens of the United States, and residents of New York, in the county of New York and State of New York, have invented a certain new and useful Railway-Electric-Motor-Cooling System, of which the following is a specification.

Our invention relates to apparatus for cooling the electric motors of electric-motor cars, and is designed to provide means whereby the cooling effect of expanding air released from a suitable source of air under pressure may be periodically applied to cooling the electric motor used in driving the car or cars.

Our invention may be used with or without the arrangement of apparatus described in our application filed August 26, 1902, Serial No. 121,077, wherein we have described the use of the discharge or exhaust air for an air-brake system for the same purpose.

Our present invention consists, substantially, in the combination, with any source of compressed air upon a railway-car driven by an electric motor, of a valve controlling the discharge of air from said source into a pipe or pipes by which it may be passed to and directed upon the electric motor or into the casing thereof, a controller driven by any suitable power and operating, preferably, continually while the car is in service, and means whereby said controller may cause said valve to open periodically to discharge the air or gas under pressure into the pipe whereby it is conveyed to the motor.

Our invention consists also in the combination, with said motor-driven controller, of means for regulating or adjusting the intervals at which the valve shall be opened.

Our invention consists also in the novel combination of apparatus and details of construction for effecting the periodical operation of the valve and for permitting the operation of the air-brake from the same prime source which supplies the compressed air passed through the aforesaid periodically-operating valve.

In the accompanying drawings, Figure 1 is a general plan of apparatus embodying our invention. Fig. 2 is a side elevation of the same apparatus as located beneath the car-body. Fig. 3 is a general plan of similar apparatus controlled by a modified form of controlling device, and Fig. 4 is a side elevation of the apparatus shown in Fig. 3. Figs. 5 and 6 illustrate modifications of the details of our apparatus. Fig. 7 shows another modification.

Referring to Fig. 1, E is a storage-tank adapted to contain air under pressure furnished thereto through pipe 11 from any suitable compressor or other source, as well understood in the art of air-brakes. The means for supplying air to tank E and for maintaining pressure of air therein form no particular part of our present invention. F is an auxiliary tank for the air-brake system, to which auxiliary tank air is supplied through the pressure reducing and regulating valve 19 from the source E. 18 is the coupling-pipe, to which 19 is connected, and G is an additional auxiliary tank connected with 18 through a pressure reducing and regulating valve 20. Pipe 21 connects auxiliary tank F with the usual brake-control valve by which air is admitted under pressure from pipe 21 to a pipe 22, in turn connected with the usual brake-cylinder J, the exhaust of which valve may, if desired, be connected with a pipe 24, by which the exhaust may be taken to the motor of the car and allowed to expand into or upon the motor for the purpose of keeping the same cool, and as more particularly described in our application filed August 26, 1902, Serial No. 121,077. The pressure-regulating valves 19 20 are set so as to allow air to pass into the auxiliary tanks F G at any suitable pressure—say a pressure varying from seventy to ninety pounds. It will be understood that the pipes 22, 21, and 24 would for a service wherein the cars are made up into trains be preferably provided with the usual couplings at the ends of the car for joining the pipes to those of other cars, so as to form train-pipes when the cars are made up into a train. The auxiliary tank G supplies air under pressure through a branch 29 to a pipe 24, which is suitably connected with the casing of the motor or motors of the car by a flexible pipe 27 or other means by which the air under pressure may be delivered into said casing and allowed to expand therein directly or through a number of fine openings for the purpose of producing cold or refrigeration by the sudden expansion, and thereby keeping down the temperature of said motor. The air from G is allowed to periodically discharge into pipes 29 and 24 through any suitable valve K, the operation of which is controlled by a motor-driven device acting, preferably, continuously while the car is in service. The operation of said valve is initially controlled from a revolving arm 60, driven from any suitable motor power—as, for instance, from an electric motor 70—which may take current from any source—as, for instance, from a car-circuit which supplies the propelling-motor thereof. The motor 70 imparts continued rotation to the arm 60 through shaft 35 and a worm-gear 42 in obvious manner; and the arm 60 carries a contact brush or block 45, adapted to ride over one or more segmental contact-plates 72, carried by the plate 43, and whose width varies from the center of rotation of the arm 60 outward, so that adjusting the contact 45 longitudinally on the arm the duration of the closure of circuit produced by 45 may be adjusted. The circuit closed by the operation of the arm is one by which electromagnet 34 may be energized. Valve K may be of the form known in steam-engineering as a "snifting" or "pop" valve, such as is used for releasing excessive pressure, and the movable core or armature of the electromagnet may be connected with the usual trip-lever 33, employed with such forms of valve for permitting the same to be manually operated. As will be understood, the valve when used in this combination should be properly set so as not to discharge by the pressure accumulated behind it in the tank G. When valve K is opened, air is permitted to discharge freely from the tank G into pipe 29, and thence is carried to the motor to cool the same. The length of time during which the valve K will remain open will depend upon the duration of the contact or closure of circuit effected by the brush 45, since as soon as said circuit is broken the magnet 34 will loose its power and the valve will close by the action of its spring. In the intervals pressure accumulates in tank G through reducing-valve 20, and said supplemental tank G is ready to furnish a large volume of air under pressure as soon as valve K is again opened.

Any desired form of valve or construction of an electromagnet for actuating the same may be used, as will be obvious to electricians.

While we have shown the arm 60 as operating through the intervention of an electrical power to bring about the action of the valve which opens connection from the source G to the motor of the car, we do not limit ourselves to this particular means, but may cause the arm 60 to act in any other suitable way to open said valve. Thus, for instance, motion may be imparted thereto from the car-axle, in the manner indicated in Fig. 7, wherein we illustrate the transmission of power from the gear-axle by a gear 80 or any other suitable power-transmitting device to a shaft 81, mounted in suitable bearings on a frame or plate 82, secured to the car-truck. From said shaft 81 motion may be transmitted by a gear 83 to the shaft 35, from which by the worm-gear 42 motion may be communicated to the revolving arm 60 or other device acting on the circuit-closer or other means, as already described, for causing the valve to open. The proportioning of the gear would depend upon the length of time which it is desired should elapse between the successive actions of the valve.

In the modification of our invention shown in Figs. 3 and 4 we substitute for the arm 60 and revolving brush a cylinder 51, carrying a contact 75, whose edge is inclined to the path of revolution, so that by adjusting the contact-spring 54 longitudinally with respect to the axis of rotation the duration of closure of circuit during each revolution of the cylinder may be adjusted. It will be understood that the opposite edge of the contact 75 would be substantially parallel to the axis of rotation and that a portion of the cylinder will be cut away to afford the intervals during which the circuit would be broken. The circuit is taken in obvious manner through brush 54, contact 75, and by brush 53, bearing on the axis 52 of the cylinder. A coil 55 may be connected across the terminal of the circuit-closer, as shown, to take up the spark at the break of contact. This coil is of such resistance that while the circuit-closer is open current will flow in reduced amount insufficient to give the electromagnet power to overcome the tension of the retractor-spring operating on arm 32.

While we have shown the use of an electric power between the continually-operating motor or device for bringing about the action of the valve K, we do not limit ourselves to the use of such power or means and may use any desired mechanism or device through which the operating motor or other mechanism continually in action while the car is in service may at intervals cause said valve to open. Thus, for instance, as illustrated in Fig. 6, a cam 150, to which rotation of any desired speed may be imparted, may act intermittently upon an arm 65, extending from the trip-lever 33, said cam being driven by power derived from the car-axle through any suitable devices, such as are employed for driving electric motors from car-axles. Instead of operating the valve directly by the power of the electromagnet 34 it may be operated by means of a power released through the action of said magnet. This power may be air-pressure derived from any desired source—as, for instance, from the tank E—conveyed through a pipe 30, having a valve 31, whose lever is suitably connected with lever 33, as illustrated in Fig. 5. The latter is operated by suitable connection with movable core or armature of electromagnet 34 or might be operated by a cam in the manner illustrated in Fig. 5.

Valve K should have large ports, so as to discharge freely, and valve 31 should have restricted carrying capacity, the purpose being to use the air admitted through 30 only to set off the valve K, which thereupon discharges the air and reduces the pressure of G, so as to require fresh supply through valve 20. Valve K, as shown in vertical section is of the well-known form, as shown, but it has its stem 108 extended through its top to connect with the piston 101, working in a cylinder fastened to the top of valve K and conected with valve 31 by pipe 109, through which the pressure is admitted beneath piston 101 to lift the piston and open the valve K. Valve 31 should be of the usual type adapted to permit the pressure in pipe 109 to exhaust through a port 100, when the valve 31 closes to shut off the pressure.

If it be desired to regulate or adjust the frequency of the discharge of air from tank G, this may be accomplished by regulating the speed of the prime controller—such, for instance, as the motor-driven contact-arm 60—which may be done by regulating the speed of the electric motor driving said arm, or any intermediate speed-changing device may be employed.

What we claim as our invention is—

1. The combination with an electric-railway motor and a source of compressed air carried by a car propelled thereby, of a valve adapted to release and discharge the air from said source into or upon the motor to keep the temperature of the same down, and means for controlling the action of said valve operating periodically and independently of any variations of pressure in the source of compressed air.

2. The combination with an electric-railway motor, of a source of compressed air upon the car or train of cars propelled by said motor, a valve in the passage between said source and the motor, controlling means for governing the action of said valve, and a continually-operating motor for operating said controlling means.

3. The combination with an electric-railway motor, of a source of compressed air, a pipe for delivering the air under pressure to said motor, a valve in said pipe, a rotating circuit-controller, and a magnet governed thereby and in turn governing the action of the cam, as and for the purpose described.

4. The combination with an electric-railway motor, a source of compressed air for furnishing the cooling agent to keep the temperature of said motor down, a magnetically-controlled valve governing the passage of air from said source to the motor, a circuit closer and breaker, and means for adjusting the duration of the closure of circuit effected by the latter, as and for the purpose described.

5. The combination with an electrically-propelled car and the motor therefor, of a compressed-air tank E carried by the car, a supplemental tank F connected with the tank E and supplying air to an air-brake system, a supplemental tank G also connected with the tank E through a reducing-valve, and means for opening the connection between tank G and a pipe for conveying the compressed air to the electric motor as and for the purpose described.

6. The combination with an electric-railway motor and an air-brake equipment for the car or train of cars propelled by said motor, of a reservoir of compressed air, a supplemental tank connected with said reservoir to a reducing-valve and in turn furnishing air for the air-brake equipment, a supplemental tank also connected to said reservoir and furnishing air for cooling the motor directly, and an exhaust for the air-brake equipment also furnishing air for cooling the motor.

7. The combination with an electric-railway motor and an air-brake equipment for the car or train of cars propelled by said motor, of a reservoir of compressed air, a supplemental tank connected with said reservoir through a reducing-valve and in turn furnishing air for the air-brake equipment, and a supplemental tank also connected to said reservoir and furnishing air for cooling the motor directly.

Signed at New York, in the county of New York and State of New York, this 9th day of August, A. D. 1902.

CYPRIEN O. MAILLOUX.
WILLIAM C. GOTSHALL.

Witnesses:
WALTER L. BUNNELL,
ETHEL L. LAWLER.